United States Patent [19]

Miyagawa et al.

[11] Patent Number: 4,924,321
[45] Date of Patent: May 8, 1990

[54] METHOD AND APPARATUS FOR IMAGE READ-OUT AND REPRODUCTION, AND MULTI-SEMICONDUCTOR-LASER LIGHT SOURCE DEVICE FOR THE SAME

[75] Inventors: Ichirou Miyagawa; Toshitaka Agano, both of Kanagawa, Japan

[73] Assignee: Fuji Photo Film Co., Ltd., Kanagawa, Japan

[21] Appl. No.: 310,997

[22] Filed: Feb. 17, 1989

[30] Foreign Application Priority Data

Feb. 18, 1988 [JP] Japan .................................. 63-35836
Feb. 18, 1988 [JP] Japan .................................. 63-35837

[51] Int. Cl.⁵ ........................ H04N 1/23; H04N 1/04; H04N 1/10; G01D 9/42
[52] U.S. Cl. .................................. 358/296; 358/302; 358/481; 358/484; 358/496; 346/108; 346/76 L; 219/121.76; 350/6.7
[58] Field of Search ................ 358/296, 302, 474, 480, 358/481, 482, 484, 494, 496; 346/108, 76 L, 107 R; 219/121.76; 350/6.7

[56] References Cited

U.S. PATENT DOCUMENTS

| | | | |
|---|---|---|---|
| 4,423,426 | 12/1983 | Kitamura | 358/285 |
| 4,445,126 | 4/1984 | Tsukada | 358/285 |
| 4,681,394 | 7/1987 | Noguchi | 350/6.7 |
| 4,689,482 | 8/1987 | Horikawa et al. | 219/121.76 |
| 4,689,690 | 8/1987 | Aagano | 358/285 |

*Primary Examiner*—Bruce A. Reynolds
*Assistant Examiner*—Scott A. Rogers
*Attorney, Agent, or Firm*—Sughrue, Mion, Zinn, Macpeak & Seas

[57] ABSTRACT

An image read-out and reproducing method comprises the steps of conveying an image storage sheet, on which an image has been recorded, or a recording sheet, on which an image is to be reproduced, in a sub-scanning direction by a single sub-scanning system, and reading out the image from the image storage sheet by scanning the image storage sheet with read-out light in a main scanning direction and detecting the light emitted from the image storage sheet which is being scanned. An image is reproduced on the recording sheet by scanning the recording sheet with reproducing light modulated in accordance with the image, which has been read out, in a main scanning direction. Laser beams produced by a plurality of semiconductor lasers are combined, and the combined laser beams are utilized as the read-out light. Only one or some of a plurality of the semiconductor lasers are operated at the time of image reproduction, and the laser beams emitted thereby are modulated and utilized as the reproducing light.

9 Claims, 4 Drawing Sheets

METHOD AND APPARATUS FOR IMAGE READ-OUT AND REPRODUCTION, AND MULTI-SEMICONDUCTOR-LASER LIGHT SOURCE DEVICE FOR THE SAME

BACKGROUND OF THE INVENTION

1. Field of the Invention

This invention relates to an image read-out and reproducing method for carrying out read out of an image stored on an image storage sheet such as a stimulable phosphor sheet and reproduction of the image thus read out on a recording sheet by use of a single scanning system, and an apparatus for carrying out the method. This invention particularly relates to an image read-out and reproducing method wherein semiconductor lasers are utilized as a scanning light source, and an apparatus for carrying out the method. This invention also relates to a multi-semiconductor-laser light source device for use in the apparatus.

2. Description of the Prior Art

Image read-out apparatuses for reading out an image recorded on a sheet by two-dimensionally scanning a light beam such as a laser beam on the sheet carrying the image recorded thereon, and by detecting light carrying the image information (for example, light reflected by the sheet, light transmitted therethrough, or light emitted thereby), which light is obtained when the sheet is exposed to the light beam, by use of a photo detecting means provided with a photomultiplier or the like have heretofore been widely used as scanners for plate making, in computer input devices, and in facsimile image read-out devices.

On the other hand, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored during exposure to the radiation. A phosphor exhibiting such properties is referred to as a stimulable phosphor. As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to radiation which has passed through an object such as the human body in order to store a radiation image of the object thereon, and is then scanned with stimulating rays such as a laser beam which cause it to emit light in proportion to the amount of energy stored during exposure to the radiation. The light emitted by the stimulable phosphor sheet upon stimulation thereof is photoelectrically detected and converted into an electric image signal, and the image signal is used to reproduce the radiation image of the object as a visible image on a recording material such as a photographic film, a display device such as a cathode ray tube (CRT), or the like.

In the aforesaid radiation image recording and reproducing system, the radiation image stored on the stimulable phosphor sheet is read out by deflecting stimulating rays and causing them to scan the stimulable phosphor sheet in a main scanning direction in a radiation image read-out apparatus, simultaneously moving the stimulable phosphor sheet with respect to the stimulating rays in a sub-scanning direction approximately normal to the main scanning direction, thereby scanning the overall surface of the stimulable phosphor sheet with the stimulating rays, and photoelectrically detecting the light emitted by the scanned portion of the stimulable phosphor sheet by use of a photodetector.

On the other hand, the image which has been read out by a read-out apparatus such as the aforesaid radiation image read-out apparatus is reproduced as a visible image by, for example, causing a light beam modulated in accordance with the image signal obtained by the read-out apparatus to scan a recording sheet in the main scanning direction while the recording sheet is being moved with respect to the light beam in the sub-scanning direction, and thus recording the visible image on the recording sheet. Therefore, in order to form the final visible image of the image, which was stored on an image storage sheet such as a stimulable phosphor sheet, on a recording sheet, it has heretofore been necessary to provide the read-out apparatus for reading out the image from the image storage sheet and the reproducing apparatus for reproducing the image on the recording sheet.

In recent years, various attempts have been made to simplify the overall radiation image recording and reproducing system as much as possible, to make the apparatus smaller as a whole and to reduce the manufacturing cost thereof. As one of such attempts, a novel read-out and reproducing apparatus has been proposed in Japanese Unexamined Patent Publication No. 58(1983)-184677. In the proposed read-out and reproducing apparatus, the conventional read-out apparatus, wherein scanning with a light beam is carried out, and the conventional reproducing apparatus, wherein scanning with a light beam is carried out, are combined with each other so that both image read out and image reproduction may be carried out by use of a single scanning system.

However, in the read-out and reproducing apparatus mentioned above, scanning must be carried out by use of a light beam of a predetermined intensity in the course of image read-out, and scanning must be carried out by use of a light beam modulated in accordance with the image information in the course of image reproduction. Therefore, in the read-out and reproducing apparatus proposed in Japanese Unexamined Patent Publication No. 58(1983)-184677, a light modulator is moved into the path of the light beam in the course of image reproduction, and is retracted from the path of the light beam in the course of image read-out. Therefore, a mechanism for moving the light modulator is necessary, and the configuration of the apparatus becomes complicated. Accordingly, the applicant has proposed in Japanese Patent Application No. 62(1987)-335505, corresponding to U.S. Ser. No. 195,333 a read-out and reproducing apparatus wherein a light modulator such as an acousto-optic modulator (AOM) is secured in an optical path of the light beam so that the mechanism is simplified and a suitable light beam is obtained both in the course of image read out and in the course of image reproduction.

It has heretofore been known to utilize a semiconductor laser as a means for producing read-out light for image read out or reproducing light for image reproduction. The semiconductor laser has advantages over a gas laser in that the semiconductor laser is small, cheap and consumes little power. Also, with the semiconductor laser, direct analog modulation can be achieved by controlling the drive current. Therefore, when both image read out and reproduction are to be carried out with a single scanning system, a light modulator such as an AOM need not be provided or moved into and out of an optical path.

However, the output power of the semiconductor laser is low (20 mW to 30 mW) when radiation is carried out continuously. Therefore, the semiconductor laser is not suitable for use as a means for producing read-out light in cases where, for example, a high energy light beam is required to stimulate a phosphor sheet in order to read out a image stored thereon.

In order to obtain a scanning laser beam having a sufficiently high energy from a semiconductor laser having a low power output, a plurality of semiconductor lasers may be used, and laser beams radiated out of the semiconductor lasers may be combined so as to multiply the power of the individual lasers.

In general, in order to combine the laser beams produced by a plurality of semiconductor lasers and to use the combined laser beams as scanning light, the laser beams produced by the semiconductor lasers are collimated respectively by collimator lenses, guided along optical paths parallel and close to one another, and made to impinge upon a light deflector.

However, in the aforesaid read-out and reproducing apparatus wherein both image read out and reproduction are carried out by use of a single scanning system, the scanning light used during image reproduction need not have as high an intensity as the scanning light used during image read out. Therefore, in cases where a light source device comprising a plurality of semiconductor lasers is used as a light source for producing read-out light, a light source for producing reproducing light having a comparatively low intensity must be provided additionally. As a result, the configuration of the read-out and reproducing apparatus becomes complicated, and the apparatus becomes large.

SUMMARY OF THE INVENTION

The primary object of the present invention is to provide an image read-out and reproducing method for carrying out both image read-out and reproduction by use of a single scanning system, wherein read out light suitable for image read out and reproducing light suitable for image reproduction are produced by use of semiconductor lasers without rendering an apparatus for carrying out the method complicated or large.

Another object of the present invention is to provide an apparatus for carrying out the image read-out and reproducing method.

The specific object of the present invention is to provide a multi-semiconductor-laser light source device for use in an image read-out and reproducing apparatus for carrying out both image read-out and reproduction by use of a single scanning system, which device produces read-out light and reproducing light without rendering the image read-out and reproducing apparatus complicated or large.

The present invention provides an image read-out and reproducing method for conveying an image storage sheet, on which an image has been recorded, or a recording sheet, on which an image is to be reproduced, in a sub-scanning direction by a single sub-scanning means, reading out the image from the image storage sheet by scanning the image storage sheet with read out light in a main scanning direction and detecting the light emitted from the image storage sheet which is being scanned, and reproducing an image on the recording sheet by scanning the recording sheet in a main scanning direction with reproducing light modulated in accordance with the image, wherein the improvement comprises the steps of:

(i) combining laser beams produced by a plurality of semiconductor lasers and utilizing the combined laser beams as said read-out light, and (ii) operating one or some of a plurality of said semiconductor lasers, modulating the laser beams emitted thereby and utilizing the laser beams thus produced as said reproducing light at the time of image reproduction.

The present invention also provides an image read-out and reproducing apparatus for conveying an image storage sheet, on which an image has been recorded, or a recording sheet, on which an image is to be reproduced, in a sub-scanning direction by a single sub-scanning means, reading out the image from the image storage sheet by scanning the image storage sheet with read-out light in a main scanning direction and detecting the light emitted from the image storage sheet which is being scanned, and reproducing an image on the recording sheet by scanning the recording sheet in a main scanning direction with reproducing light modulated in accordance with the image, wherein the improvement comprises the provision of a scanning light producing means constituted so that laser beams produced by a plurality of semiconductor lasers are combined at the time of image read-out and the combined laser beams are utilized as said read-out light, whereas at the time of image reproduction one or some of a plurality of said semiconductor lasers are operated, and the laser beams emitted thereby are modulated and utilized as said reproducing light.

A plurality of the semiconductor lasers should preferably be secured to a single support, so that the image read-out and reproducing apparatus can be kept small and the control of each semiconductor laser can be facilitated.

With the image read-out and reproducing method and apparatus in accordance with the present invention wherein the laser beams produced by a plurality of semiconductor lasers are combined at the time of image read out, image read out can be carried out by using read-out light having a high intensity. Also, at the time of image reproduction, reproducing light having a comparatively low intensity can be obtained by operating only one or some of a plurality of the semiconductor lasers. Therefore, with the image read out and reproducing method and apparatus in accordance with the present invention, scanning light suitable for image read out and scanning light suitable for image reproduction can be obtained without providing an additional light source for image reproduction.

The present invention further provides a multi-semiconductor-laser light source device for use in an image read-out and reproducing apparatus for conveying an image storage sheet, on which an image is to be reproduced, in a sub-scanning direction by a single sub-scanning means, reading out the image from the image storage sheet by scanning the image storage sheet with read-out light in a main scanning direction and detecting the light emitted from the image storage sheet which is being scanned, and reproducing an image on the recording sheet by scanning the recording sheet in a main scanning direction with reproducing light modulated in accordance with the image, the multi-semiconductor-laser light source device comprising:

(i) a plurality of semiconductor lasers for image read-out, (ii) one or more semiconductor lasers for image reproduction, (iii) collimator optical systems for respectively collimating laser beams produced by said semiconductor lasers for image read out and for image reproduction, (iv) optical path adjusting elements for radiating said laser beams along optical paths parallel and close to one another, and (v) a control means for operating said semiconductor lasers used during image read out so that they radiate at the time of image read out, and operating said semiconductor lasers used during image reproduction so that they radiate at the time of image reproduction, wherein said semiconductor lasers used for image read out, said semiconductor lasers used for image reproduction, said collimator optical systems, and said optical path adjusting elements are supported on a single support.

The term "radiating laser beams along optical paths parallel and close to one another" as used herein means that the laser beams are radiated so as to be capable of being processed as a single bundle of beams such that, for example, the laser beams can be caused to impinge upon a single reflection surface of a light deflector and deflected thereby, and/or can be converged by a single scanning lens onto a single position. In this case, some of the laser beams may be radiated along a single optical path.

With the multi-semiconductor-laser light source device in accordance with the present invention, a plurality of semiconductor lasers to be used during image read out and one or more semiconductor lasers to be used during image reproduction are secured to a single support, and can be activated selectively for image read out or for image reproduction. Therefore, scanning light having an intensity suitable for image read out and scanning light having an intensity suitable for image reproduction can be obtained from a compact combination of a read-out light source and a reproducing light source. Accordingly, when the multi-semiconductor-laser light source device in accordance with the present invention is used in an image read-out and reproducing apparatus, suitable read-out light and suitable reproducing light can be obtained without rendering the apparatus large as a whole.

DESCRIPTION OF THE PREFERRED EMBODIMENTS

The present invention will hereinbelow be described in further detail with reference to the accompanying drawings.

Figure 1:
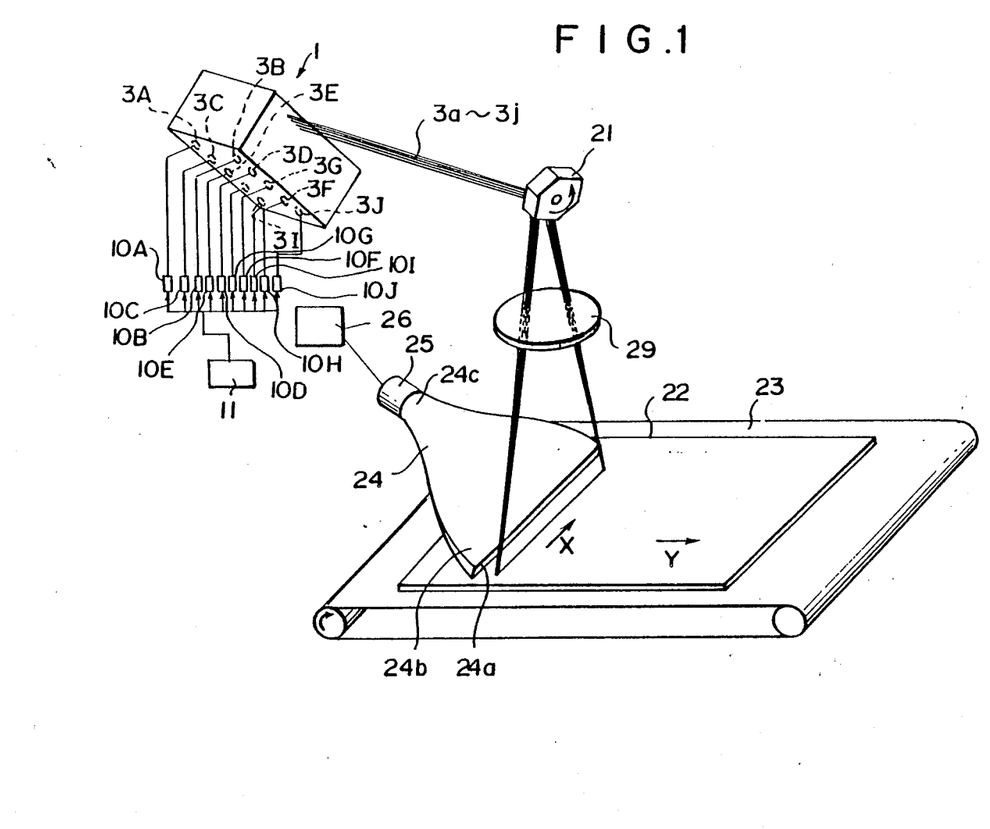
FIGS. 1 and 2 are perspective views showing an image read-out and reproducing apparatus for carrying out an embodiment of the image read-out and reproducing method in accordance with the present invention.
Figure 2:
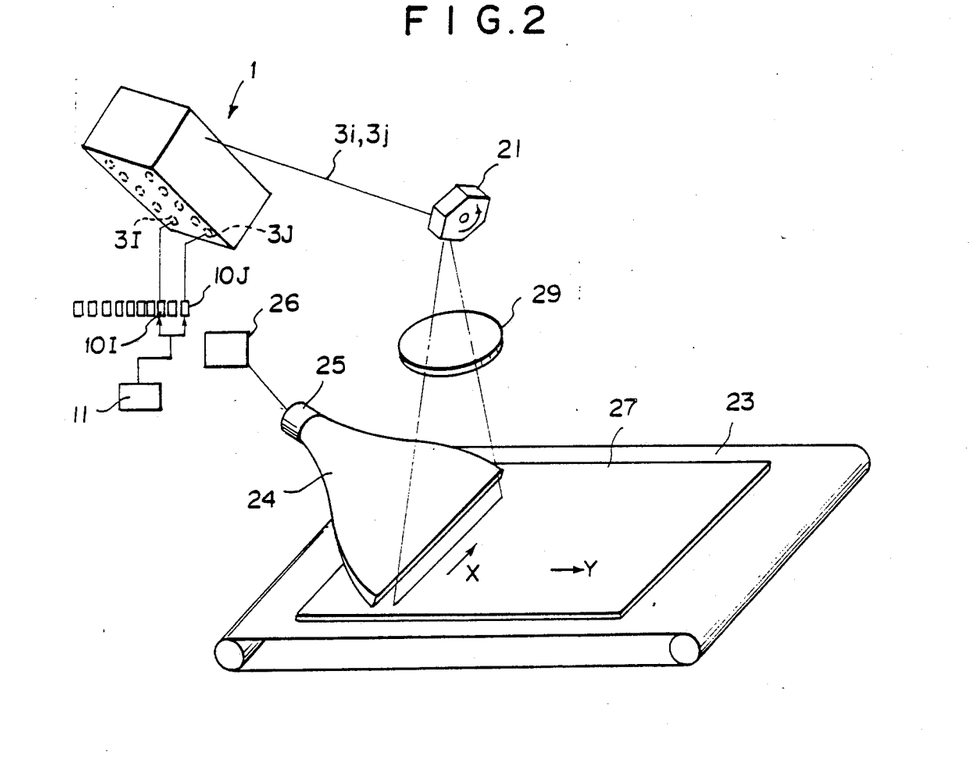

FIGS. 1 and 2 show the states of an image read-out and reproducing apparatus for carrying out an embodiment of the image read-out and reproducing method in accordance with the present invention at the time of image read out and at the time of image reproduction.

The image read-out and reproducing apparatus is provided with a multi-semiconductor-laser light source device 1 as a scanning light producing means. By way of example, the multi-semiconductor-laser light source device 1 comprises ten semiconductor lasers 3A, 3B, 3C, 3D, 3E, 3F, 3G, 3H, 3I and 3J. The semiconductor lasers 3A through 3J are connected respectively to light source operating circuits 10A, 10B, 10C, 10D, 10E, 10F, 10G, 10H, 10I and 10J which are controlled by a control circuit 11. The semiconductor lasers 3A through 3J are respectively turned on and off by the light source operating circuits 10A through 10J. In this embodiment, a control means of the multi-semiconductor-laser light source device 1 is constituted of the light source operating circuits 10A through 10J and the control circuit 11. One configuration of the multi-semiconductor-laser light source device 1 will hereinbelow be described with reference to FIG. 3.

Figure 3:
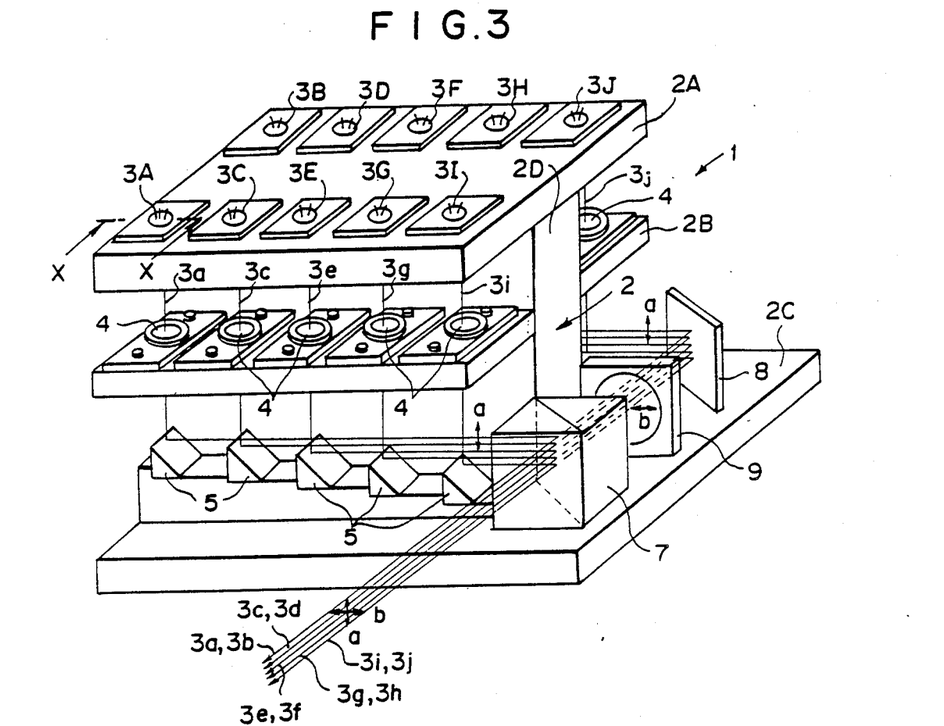
FIG. 3 is a perspective view showing a multi-semiconductor-laser light source device provided in the image read-out and reproducing apparatus shown in FIGS. 1 and 2.

In the multi-semiconductor-laser light source device 1, the semiconductor lasers 3A through 3J are secured to an upper plate 2A of the support 2 so that their axes of beam emission are parallel to one another. Ten concave lenses 4, 4, ... are secured to a middle plate 2B of the support 2 so that they face the semiconductor lasers 3A through 3J. Also, ten prism mirrors 5, 5, ... acting as optical path adjusting elements are secured to a lower plate 2C of the support 2 so that they face the concave lenses 4, 4, .... The semiconductor lasers 3A through 3J, the concave lenses 4, 4, ... and the prism mirrors 5, 5, ... are positioned symmetrically with respect to a wall member 2D of the support 2, which wall member 2D supports the upper plate 2A, the middle plate 2B and the lower plate 2C.

Figure 4:
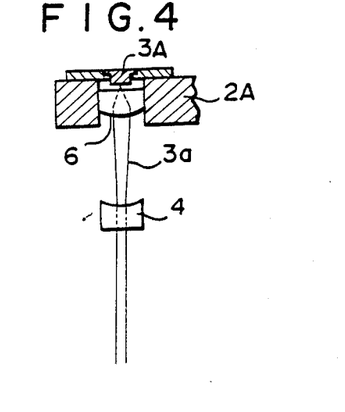
FIG. 4 is a sectional view taken along line X—X in FIG. 3.

Convex lenses 6, 6, ... (not shown in FIG. 3) are provided inside of the upper plate 2A so that they face the semiconductor lasers 3A through 3J. (By way of example, FIG. 4 shows the convex lens 6 facing the semiconductor laser 3A.) In this multi-semiconductor-laser light source device 1, a collimator optical system is constituted of the concave lens 4 and the convex lens 6. As shown in FIG. 4, a laser beam $3a$ produced by the semiconductor laser 3A is passed through and collimated by the collimator optical system. In the same manner, laser beams $3b$ through $3j$ produced by the semiconductor lasers 3B through 3J are collimated by corresponding collimator optical systems provided in the optical paths of the laser beams $3b$ through $3j$.

The laser beams $3a$, $3c$, $3e$, $3g$ and $3i$ after being collimated are reflected by the prism mirrors 5, 5, ... provided therebelow, and impinge upon a polarization beam splitter 7. The semiconductor lasers 3A, 3C, 3E, 3G and 3I are positioned so as to radiate the laser beams $3a$, $3c$, $3e$, $3g$ and $3i$ in a single plane. Also, the prism mirrors 5, 5, ... provided in the optical paths of the laser beams $3a$, $3c$, $3e$, $3g$ and $3i$ are vertically deviated little by little from one another as shown in FIG. 3. Therefore, the positions from which the laser beams 3a, 3c, 3e, 3g and 3i are reflected by the prism mirrors 5, 5, ... vary little by little only in the vertical direction, and the laser beams 3a, 3c, 3e, 3g and 3i after being reflected by the prism mirrors 5, 5, ... follow optical paths which are parallel and very close to one another in the vertical direction. Also, on the rear side of the wall member 2D, laser beams 3b, 3d, 3f, 3h and 3j produced by the semiconductor lasers 3B, 3D, 3F, 3H and 3J are reflected by the prism mirrors 5, 5, ... and then follow optical paths which are parallel and very close to one another in the vertical direction. As for the laser beams produced by each pair of the semiconductor lasers provided facing each other with the wall member 2D intervening therebetween (i.e. the laser beams 3a and 3b, the laser beams 3c and 3d, and so on), the heights of the respective pairs of laser beams are equal to each other after being reflected by corresponding prism mirrors 5,5. Furthermore, the semiconductor lasers 3A through 3J are secured to the upper plate 2A so that the directions of polarization of the laser beams 3a through 3j after being reflected by the prism mirrors 5, 5, ... are the same (i.e. the direction coincides with the direction indicated by the arrow "a" in FIG. 3).

Figure 5:
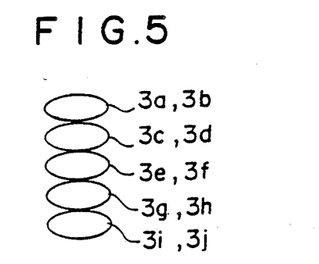
FIG. 5 is a schematic view showing cross-sections of laser beams radiated from the multi-semiconductor-laser light source device shown in FIG. 3.

The polarization beam splitter 7 reflects light polarized in the direction indicated by the arrow "a". Therefore, the laser beams 3a, 3c, 3e, 3g and 3i are reflected by the polarization beam splitter 7. On the other hand, the laser beams 3b, 3d, 3f, 3h and 3j are reflected by a mirror 8 so that their optical paths are changed by an angle of approximately 90°. Then, the laser beams 3b, 3d, 3f, 3h and 3j are passed through a halfwave plate 9 so that the direction of polarization is changed by an angle of 90°, and the laser beams 3b, 3d, 3f, 3h and 3j are converted to light polarized in the direction indicated by the arrow "b". The polarization beam splitter 7 transmits light polarized in the direction indicated by the arrow "b". Therefore, the laser beams 3b, 3d, 3f, 3h and 3j after being polarized in the direction indicated by the arrow "b" pass through the polarization beam splitter 7. The laser beam 3b is radiated along the same optical path as the laser beam 3a, and the laser beam 3d is radiated along the same optical path as the laser beam 3c. Also, the laser beam 3f is radiated along the same optical path as the laser beam 3e, the laser beam 3h is radiated along the same optical path as the laser beam 3g, and the laser beam 3j is radiated along the same optical path as the laser beam 3i. FIG. 5 shows cross-sections of the laser beams 3a through 3j radiated along the optical paths parallel and close to one another.

Reverting to FIG. 1, during image read out, the control circuit 11 feeds drive signals to all of the light source operating circuits 10A through 10J, and the semiconductor lasers 3A through 3J are activated by the light source operating circuits 10A through 10J so as to produce the laser beams 3a through 3j. Therefore, the laser beams 3a through 3j which are radiated from the multi-semiconductor-laser light source device 1 along the optical paths parallel and close to one another and which apparently constitute a single bundle of beams as described above impinge upon a rotating polygon mirror 21 acting as a light deflector, and are reflected and deflected by the rotating polygon mirror 21, which rotates in the direction indicated by the arrow. On the other hand, below the rotating polygon mirror 21, a stimulable phosphor sheet 22 on which a radiation image has been stored is conveyed by an endless belt device 23, which acts as a sub-scanning means, in a sub-scanning direction indicated by the arrow Y. The laser beams 3a through 3j, after being reflected and deflected by the rotating polygon mirror 21 as mentioned above, are converged by a scanning lens, which may be an fθ lens, onto the stimulable phosphor sheet 22, and repeatedly scan the stimulable phosphor sheet 22 in a main scanning direction indicated by the arrow X. The main scanning direction is approximately normal to the sub-scanning direction. Accordingly, the overall surface of the stimulable phosphor sheet 22 is two-dimensionally scanned with the combined laser beams 3a through 3j, and a comparatively high light beam intensity is achieved.

The combined laser beams 3a through 3j act as stimulating rays for the stimulable phosphor sheet 22. When the stimulable phosphor sheet 22 is scanned with the combined laser beams 3a through 3j, exposed portions of the stimulable phosphor sheet 22 emit light (not shown) in proportion to the amount of energy stored during the exposure to radiation. The emitted light enters a transparent light guide member 24 having a light input edge face 24a positioned parallel to the main scanning line in the vicinity of the stimulable phosphor sheet 22. The light guide member 24 has a flat front end portion 24b positioned close to the stimulable phosphor sheet 22, and is formed gradually into a cylindrical shape toward the rear end side to constitute an approximately cylindrical rear end portion 24c, which is put into close contact with a photomultiplier 25 acting as a photodetector. The light emitted by the stimulable phosphor sheet 22 and entering the light guide member 24 from its light input edge face 24a is condensed to the rear end portion 24c and is detected by the photomultiplier 25. The photomultiplier 25 converts the detected light into an electric image signal, which is then sent to an image processing circuit 26 and subjected to image processing.

With reference to FIG. 2, after the image read out is finished, a recording sheet 27 which may be a photographic film, a photographic paper or the like is moved by the endless belt device 23 in the direction indicated by the arrow Y, thereby reproducing the radiation image read out in the manner described above. Before the recording sheet 27 is thus moved, the control circuit 11 stops feeding the drive signals to the light source operating circuits 10A through 10H, and feeds drive signals only to the light source operating circuits 10I and 10J in order to operate only the semiconductor lasers 3I and 3J. Also, modulation signals in accordance with the image signals which have been detected in the manner described above are fed to the light source operating circuits 10I and 10J, and therefore the semiconductor lasers 3I and 3J radiate laser beams 3i and 3j having intensities corresponding to the modulation signals. Of course, the total intensity of the laser beams 3i and 3j which now act as the reproducing light is lower than the total intensity of the laser beams 3a through 3j which acted as the read-out light (i.e. the aforesaid stimulating rays). The laser beams 3i and 3j are deflected by the rotating polygon mirror 21, passed through the scanning lens 29, and caused to repeatedly scan the recording sheet 27, which is being moved in the sub-scanning direction indicated by the arrow Y, in the main scanning direction indicated by the arrow X. In this manner, the radiation image which has been read out from the stimulable phosphor sheet 22 is reproduced over the overall surface of the recording sheet 27. The recording sheet 27 on which the radiation image has been reproduced is sent to an automatic developing machine (not shown) and subjected to development processing.

With this embodiment of the image read out and reproducing method in accordance with the present invention wherein the laser beams produced by ten semiconductor lasers are combined and the combined laser beams are used as the read-out light (i.e. the stimulating rays), image read-out can be carried out with a read-out light having a substantially high intensity. Also, at the time of image reproduction, only one or some of the semiconductor lasers are operated, so that reproducing light having a comparatively low intensity, which is suitable for image reproduction, can be obtained without providing a special light source for image reproduction in addition to a read-out light producing means.

The number of the semiconductor lasers used in the image read-out and reproducing method in accordance with the present invention may be selected arbitrarily insofar as it is more than one, and the number of semiconductor lasers operated during image reproduction may be selected arbitrarily. Also, in order to make the image read-out and reproducing apparatus smaller, the semiconductor lasers and the optical elements for radiating the laser beams produced by the semiconductor lasers along optical paths parallel and close to one another should preferably be secured on a single support as in the aforesaid embodiment. However, the semiconductor lasers may be positioned separately from one another.

As another example of the multi-semiconductor-laser light source device, eight semiconductor lasers 3A, 3B, 3C, 3D, 3E, 3F, 3G and 3H among ten semiconductor lasers 3A through 3J may be used for image read out and operated only during image read-out, and two semiconductor lasers 3I and 3J may be used for image reproduction and operated only during image reproduction. In this case, the number of semiconductor lasers used for image read out and the number of semiconductor lasers used for image reproduction may be changed arbitrarily insofar as the number of semiconductor lasers used for image read out is more than one. Also, the layout of the lenses, the mirrors and the like in the multi-semiconductor-laser light source device may be changed when necessary.

A read-out and reproducing system wherein the image read-out and reproducing apparatus described above is employed as a read-out and reproducing section for carrying out the image read-out and reproducing method in accordance with the present invention will hereinbelow be described with reference to FIG. 6.

Figure 6:
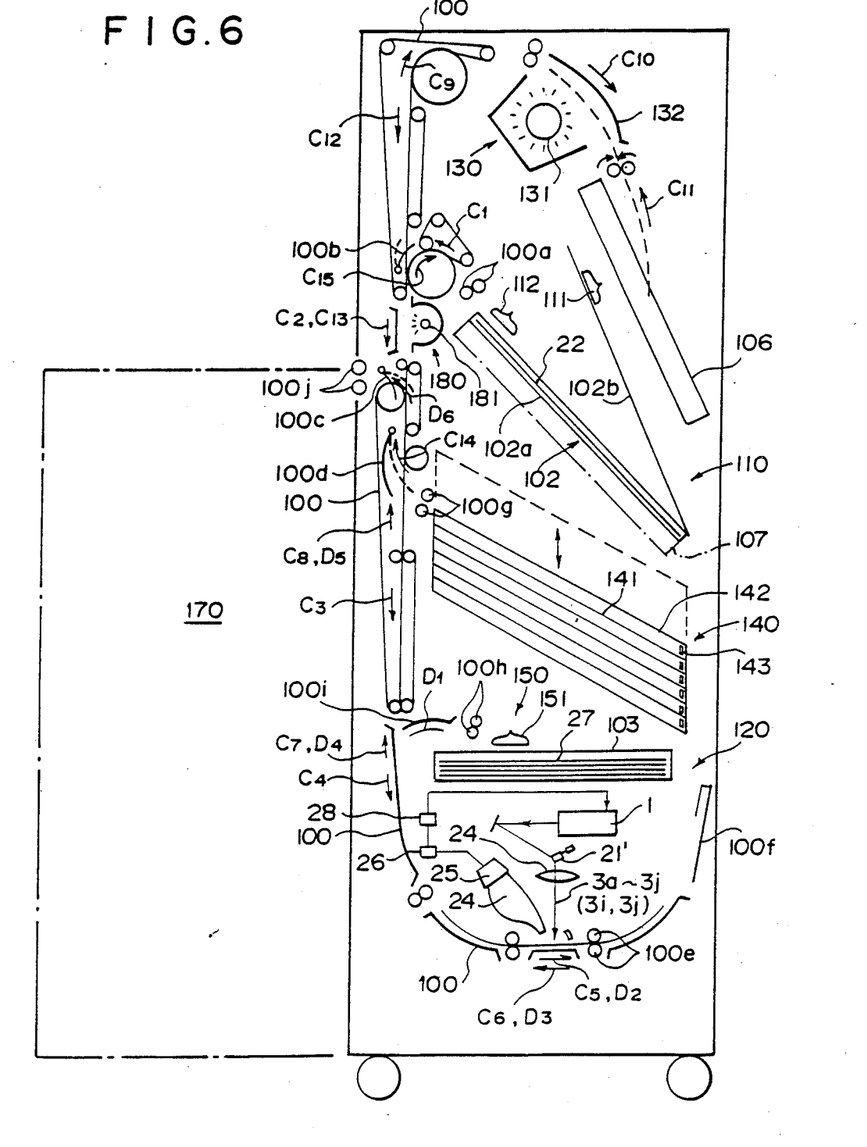
FIG. 6 is a schematic side view showing a read-out and reproducing system wherein the image read-out and reproducing apparatus shown in FIGS. 1 and 2 is employed as a read-out and reproducing section.

With reference to FIG. 6, the read-out and reproducing system is provided with a cassette holding section 110 for releasably holding a cassette 102 capable of housing the stimulable phosphor sheet 22 therein, a read-out and reproducing section 120 for reading out a radiation image stored on the stimulable phosphor sheet 22 and reproducing the radiation image thus read out, an erasing section 130 for erasing radiation energy remaining on the stimulable phosphor sheet 22 after image read-out therefrom is finished at the read-out and reproducing section 120, a stacker 140 capable of housing a plurality of the stimulable phosphor sheets 22, 22, ... therein and feeding out the housed stimulable phosphor sheets 22, 22, ... one after another, and a recording sheet feeding section 150 for releasably holding a recording sheet feed magazine 103 in which a plurality of recording sheets 27, 27, ... are housed. The sections 110, 120, 130, 140 and 150 are provided one above another, and a sheet conveyance means 100 for conveying the stimulable phosphor sheets 22, 22, ... and the recording sheets 27, 27, ... extends vertically along sides of these sections. The aforesaid sections 110, 120, 130, 140 and 150 are connected with the sheet conveyance means 100.

The stimulable phosphor sheet 22 housed in the cassette 102 was subjected to image recording in an external image recording apparatus (not shown). The cassette 102 housing the image-recorded stimulable phosphor sheet 22 is then fed into the cassette holding section 110. Each of the cassettes 102, 102, ... is sealed against light so that the stimulable phosphor sheet 22 is prevented from being exposed to external light when it is exposed to radiation during image recording thereon. The cassette 102 comprises a cassette body 102a which the stimulable phosphor sheet 22 is housed and an openable cover member 102b. When the cassette 102 is fed into the cassette holding section 110, the cover member 102b is maintained in the closed position. When the stimulable phosphor sheet 22 is to be taken out of the cassette 102 at the cassette holding section 110, the cover member 102b is opened as shown in FIG. 6 by a cover opening means 111 constituted of a suction cup or the like. After the cover member 102b is opened, a stimulable phosphor sheet take-out means 112 constituted of a suction cup or the like advances into the cassette 102, and sucks and takes the stimulable phosphor sheet 22 out of the cassette 102. The stimulable phosphor sheet take-out means 112 then transfers the stimulable phosphor sheet 22 to nip rollers 100a which are mounted near the cassette 102 and constitute part of the sheet conveyance means 100. The stimulable phosphor sheet 22 has a front surface provided with a stimulable phosphor layer and is housed in the cassette 102 so that the stimulable phosphor layer faces down.

The sheet conveyance means 100 is composed of endless belts, guide plates, rollers, and sheet distributing means. The stimulable phosphor sheet 22 whose leading edge portion is grasped by the nip rollers 100a is conveyed by the sheet conveyance means 100 in the direction indicated by the arrow C1, guided by the sheet distributing means 100b positioned as indicated by the solid line, and conveyed in the direction indicated by the arrow C2. The stimulable phosphor sheet 22 is then conveyed in the directions indicated by the arrows C3 and C4 to the read-out and reproducing section 120. Also, a secondary erasing section 180 is provided in the conveyance path of the stimulable phosphor sheet 22 for carrying out secondary erasing with an erasing light source 181 as will be described later. The erasing light source 181 is kept off at the time the stimulable phosphor sheet 22, which was taken out of the cassette holding section 110, is conveyed above the secondary erasing section 180. Also, when the stimulable phosphor sheet 22, which was taken out of the cassette 102, is sent to the read-out and reproducing section 120, sheet distributing means 100c and 100d between the secondary erasing section 180 and the read-out and reproducing section 120 are kept in the positions indicated by the solid lines, which allows the stimulable phosphor sheet 22 to be conveyed downward.

At the read-out and reproducing section 120, the laser beams 3a through 3j, which when combined have a high intensity, are radiated from the multi-semiconductor-laser light source device 1 to the stimulable phosphor sheet 22, or the laser beams 3*i* and 3*j* having low intensity are radiated to the recording sheet 27. Elements in the read-out and reproducing section 120 which are similar to elements with respect to FIGS. 1 and 2 are numbered with the same reference numerals. At the read-out and reproducing section 120, a galvanometer mirror 21' is provided as the light deflector. Also, the part of the sheet conveyance means 100 provided inside of the read-out and reproducing section 120 constitutes the sub-scanning means.

The stimulable phosphor sheet 22 sent to the read-out and reproducing section 120 is conveyed by the sheet conveyance means 100 in the direction indicated by the arrow C5, and the overall surface of the stimulable phosphor sheet 22 is two dimensionally scanned by the laser beams 3*a* through 3*j*. The light emitted by the stimulable phosphor sheet 22 in the course of the scanning is photoelectrically detected by the photomultiplier 25 after passing through the light guide member 24. The electric signal thus obtained is sent to the image processing circuit 26 in order to have image processing carried out thereon, and the processed signal is stored in a memory 28. After the image read out from the overall surface of the stimulable phosphor sheet 22 is finished, the leading edge of the stimulable phosphor sheet 22 contacts a guide plate 100*f* with the tailing edge thereof being grasped by nip rollers 100*e*. When in this position, the direction of conveyance of the stimulable phosphor sheet 22 is reversed, and the stimulable phosphor sheet 22 is conveyed in the direction indicated by the arrow C6.

As for the radiation image read out, there has heretofore been known a method wherein a preliminary read out is carried out for approximately ascertaining the radiation image stored on the stimulable phosphor sheet 1 prior to the aforesaid image read out (final read out) for obtaining an electric image signal for use in the reproduction of a visible image. The conditions under which the final read out or the like is conducted are adjusted based on the information obtained in the preliminary read out, and the final read out is carried out by use of the adjusted read-out conditions.

As disclosed in, for example, Japanese Unexamined Patent Publication No. 58(1983)-67240, the preliminary read out may be conducted by scanning the stimulable phosphor sheet 22 with stimulating rays having a lower energy than the energy of the light beam (stimulating rays) used in the final read out, and detecting the light emitted by the stimulable phosphor sheet 22 in the course of the scanning with a photoelectric read out means.

The read out and reproducing section 120 may be constituted so as to carry out only the final read out or both the preliminary read out and the final read out. For example, the preliminary read out may be carried out by conveying the stimulable phosphor sheet 22 in the direction indicated by the arrow C5, the direction of conveyance of the stimulable phosphor sheet 22 may then be reversed so that the stimulable phosphor sheet 22 is conveyed in the direction indicated by the arrow C6 to a read-out start position, and then the final read out may be carried out while the stimulable phosphor sheet 22 is again conveyed in the direction indicated by the arrow C5. The optical members in the read-out and reproducing section 120 are not limited to those described above. For example, as disclosed in Japanese Unexamined Patent Publication No. 62(1987)-16666, a long photomultiplier may be disposed along the main scanning line to serve as the photoelectric read-out means for detecting the light emitted by the stimulable phosphor sheet 22.

A comparatively long time is taken for carrying out image read out at the read-out and reproducing section 120, and therefore it often occurs that processing of the stimulable phosphor sheets cannot be achieved efficiently, especially when cassettes 102 housing new image recorded stimulable phosphor sheets 22 are loaded into the cassette holding section 110 only after the processing of a preceding stimulable phosphor sheet 22 is finished in the read-out and reproducing section 120. Accordingly, this embodiment is provided with a stacker 140. A stimulable phosphor sheet 22, after being fed out of the cassette holding section 110, may be conveyed into the stacker 140, where it waits to be conveyed to the read-out and reproducing section 120 in accordance with the conditions in the read-out and reproducing section 120.

The stacker 140 comprises a plurality of stimulable phosphor sheet housing compartments 142, 142, ...defined by partitions 141, 141, ..., and is moveable vertically in the direction indicated by the arrow between the position indicated by the solid lines and the position indicated by the broken line, so that each stimulable phosphor sheet housing compartment 142 can face nip rollers 100*g* disposed in the vicinity of the stacker 140. In the course of conveying the stimulable phosphor sheet 22 from the cassette holding section 110 into the stacker 140, the sheet distributing means 100*d* is moved to the position indicated by the broken line for guiding the stimulable phosphor sheet 22 toward the stacker 140. The stimulable phosphor sheet 22 is conveyed into a predetermined stimulable phosphor sheet housing compartment 142 of the stacker 140. After the tailing edge of the stimulable phosphor sheet 22 separates from the nip rollers 100*g*, the stimulable phosphor sheet 22 falls by its own weight, and its fall is stopped when its leading edge contacts a stopper 143 in the stimulable phosphor sheet housing compartment 142. When the stimulable phosphor sheet 22 is to be fed out of the stacker 140, the stacker 140 is moved until the stimulable phosphor sheet housing compartment 142 in which the stimulable phosphor sheet 22 is housed faces the nip rollers 100*g*, the stopper 143 is then moved to the position indicated by the broken line so that the stimulable phosphor sheet 22 is pushed up and the leading edge portion of the stimulable phosphor sheet 22 is grasped by the nip rollers 100*g*. The stimulable phosphor sheet 22 grasped by the nip rollers 100*g* is guided by the sheet distributing means 100*d*, positioned as indicated by the broken line, is conveyed upward by the sheet conveyance means 100, and is then conveyed in the directions indicated by the arrows C3 and C4 into the read-out and reproducing section 120. At this time, once the stimulable phosphor sheet 22, which was fed out of the stacker 140, is conveyed upward in this manner, the surface of the stimulable phosphor sheet 22 provided with the stimulable phosphor (i.e. the stimulating ray irradiation side) faces up in the read-out and reproducing section 120.

After the image read out from the stimulable phosphor sheet 22 is finished in the read-out and reproducing section 120, the stimulable phosphor sheet 22 is conveyed by the sheet conveyance means 100 in the directions indicated by the arrows C7, C8 and C9 into the erasing section 130. At this time, the sheet distributing means 100*b* is positioned as indicated by the broken line, and the sheet distributing means 100c and 100d are positioned as indicated by the solid lines.

At the erasing section 130, radiation energy remaining on the stimulable phosphor sheet 22 after the image has been read out therefrom is erased. Specifically, a part of the radiation energy stored on the stimulable phosphor sheet 22 in the image recording step remains stored thereon after the image read-out step is carried out. In order to reuse the stimulable phosphor sheet 22, the residual radiation energy is erased in the erasing section 130. In this embodiment, the erasing section 130 is provided with a plurality of erasing light sources 131, 131, ... constituted of fluorescent lamps, tungsten-filament lamps, sodium lamps, xenon lamps, iodine lamps or the like, and the stimulable phosphor sheet 22 is exposed to the erasing light emitted by the erasing light sources 131, 131, ... in order to release the residual radiation energy therefrom while it is conveyed along a guide plate 132 in the direction indicated by the arrow C10. In the erasing section 130, any known erasing method may be used. For example, erasing may be conducted by heating or by a combination of exposure to erasing light with heating. The stimulable phosphor sheet 22 is conveyed in the reverse direction indicated by the arrow C11 after being conveyed up to the position indicated by the broken line, and a guide plate for supporting the edge of the stimulable phosphor sheet 22 should preferably be provided outside of the erasing section 130. Also, as will be described later, if a stimulable phosphor sheet housing tray 106 is provided close to the erasing section 130, the tray 106 may be utilized as a guide.

After the erasing of the stimulable phosphor sheet 22 is finished in the erasing section 130, the stimulable phosphor sheet 22 is conveyed by the sheet conveyance means 100 in the directions indicated by the arrows C12 and C13, and is housed in the empty stimulable phosphor sheet housing compartment 142 of the stacker 140 by being guided by the sheet distributing means 100d moved to the position indicated by the broken line. When erased reusable stimulable phosphor sheets 22, 22, ... are housed in the stacker 140 in this manner, an erased reusable stimulable phosphor sheet 22 can be conveyed into the empty cassette 102 immediately after a preceding image-recorded stimulable phosphor sheet 22 is fed out of the cassette 102 in the cassette holding section 110. When a stimulable phosphor sheet 22 is to be fed out of the stacker 140 and conveyed to the cassette holding section 110, the sheet distributing means 100d is moved to the position indicated by the broken line, the sheet distributing means 100b and 100c are moved to the positions indicated by the solid lines, and the stimulable phosphor sheet 22 is conveyed by the sheet conveyance means 100 in the directions indicated by the arrows C14 and C15 into the cassette 102. A stimulable phosphor sheet 22 conveyed out of the stacker 140 may have often been kept in the stacker 140 for a long time after being subjected to erasing in the erasing section 130. In such cases, where at least a predetermined time elapses after erasure was carried out on the stimulable phosphor sheet 22, the stimulable phosphor sheet 22 stores energy from radiation emitted by radioactive isotopes such as Ra226 and K40, which are contained in trace amounts in the stimulable phosphor. It also stores energy from environmental radiation such as cosmic rays and X-rays emitted by other X-ray sources. When energy from these types of radiation is undesirably stored on the stimulable phosphor sheet 22, noise interferes with the next radiation image recorded on the stimulable phosphor sheet 22. In order to prevent the generation of noise, a secondary erasing section 180 for irradiating erasing light to the stimulable phosphor sheet 22 is disposed in the conveyance path between the stacker 140 and the cassette holding section 110. The erasing light source 181 in the secondary erasing section 180 is turned on only when a stimulable phosphor sheet 22 is fed out of the stacker 140 and conveyed toward the cassette holding section 110, thereby releasing energy stored on the stimulable phosphor sheet 22 while the stimulable phosphor sheet 22 was housed in the stacker 140. A cassette 102, which is loaded with an erased reusable stimulable phosphor sheet 22 in this manner, is taken out of the read-out and reproducing system for reuse in image recording. In this embodiment, the stimulable phosphor sheet 22 may be immediately conveyed into the cassette 102 after being erased in the erasing section 130. The stimulable phosphor sheet 22 is conveyed out of the erasing section 130 in the direction indicated by the arrow C12, may then be conveyed downward, and then finally conveyed upward into the cassette 102. As a result, the surface of the stimulable phosphor sheet 22 provided with the stimulable phosphor layer will face down when the stimulable phosphor sheet 22 is housed in the cassette 102.

On the other hand, in an external image recording apparatus, besides recording an image on a single stimulable phosphor sheet 22 housed in a cassette 102, image recording may be carried out on each of a plurality of the stimulable phosphor sheets 22, 22, ... taken out of a sheet feed magazine one by one and continuous image recording may be conducted. The stimulable phosphor sheets 22, 22, ... each carrying a radiation image stored thereon are sequentially housed in a sheet housing magazine, which is then sent to a read-out apparatus. Besides the cassette holding section 110, the read-out and reproducing system shown in FIG. 6 may also be provided with a magazine holding section disposed so as to releasably hold the stimulable phosphor sheet magazine (i.e. the aforesaid sheet housing magazine) in a correct position with respect to the sheet conveyance means 100, so that read out and erasing can also be carried out on stimulable phosphor sheets fed out of the stimulable phosphor sheet magazine. The magazine holding section may be provided at any position insofar as it is approximately aligned with the aforesaid read-out and reproducing section 120, the erasing section 130 and other sections in the vertical direction and is connected with the sheet conveyance means 100. Also, as indicated by the chained line in FIG. 6, the cassette holding section 110 and the magazine holding section may be formed integrally with each other so that the cassette holding section 110 can be loaded with both a cassette 102 and a stimulable phosphor sheet magazine 107. In cases where a magazine holding section is provided, it is necessary to provide a tray holding section for holding a tray in which the stimulable phosphor sheets are to be housed after being fed from the stimulable phosphor sheet magazine and subjected to image read out and erasure. The tray holding section may be provided at any position as long as it is connected to the sheet conveyance means 100. However, the tray holding section should preferably be provided outwardly from the erasing section 130 in such a way that the tray 106 is positioned adjacent to the erasing section 130. In this case, the tray 106 can act in the same manner as a guide for guiding a stimulable phosphor sheet 22 while it is being erased. Also, if a stimulable phosphor sheet was fed out of the stimulable phosphor sheet magazine, the stimulable phosphor sheet can be made to fall into the tray 106 and can be housed therein after it has been erased.

On the other hand, at the time the image read out from a single stimulable phosphor sheet 22 has been finished in the read-out and reproducing section 120 and the stimulable phosphor sheet 22 has been conveyed out of the read-out and reproducing section 120, a single recording sheet 27 is taken by a suction means 151 out of the recording sheet feed magazine 103 at the recording sheet feeding section 150, and transferred to nip rollers 100h located in the vicinity of the recording sheet feeding section 150. The recording sheet 27 is conveyed by the nip rollers 100h along a guide plate 100i in the direction indicated by the arrow D1, and is then conveyed by the sheet conveyance means 100 into the read-out and reproducing section 120 in the same manner as a stimulable phosphor sheet 22. In the read-out and reproducing section 120, the radiation image read from the stimulable phosphor sheet 22 in the manner described above is recorded on the recording sheet 27 while the recording sheet 27 is being conveyed in the direction indicated by the arrow D2.

During the time the recording sheet 27 is thus conveyed in the read-out and reproducing section 120, only the semiconductor lasers 3I and 3J among the semiconductor lasers 3A through 3J in the multi-semiconductor-laser light source device 1 are operated, and they produce the laser beams 3i and 3j. The laser beams 3i and 3j are modulated in accordance with the image signal stored in the memory 28. The recording sheet 27 is scanned with the laser beams 3i and 3j which now act as reproducing light, so that the radiation image which was stored on the stimulable phosphor sheet 22 is reproduced over the overall surface of the recording sheet 27.

After the image reproduction on the recording sheet 27 is finished in the read-out and reproducing section 120, the recording sheet 27 is conveyed by the sheet conveyance means 100 in the directions indicated by the arrows D3, D4 and D5. At this time, the sheet distributing means 100d is positioned as indicated by the solid line, and the sheet distributing means 100c is moved to the position indicated by the broken line. The recording sheet 27 is thereby guided in the direction indicated by the arrow D6 until the leading edge of the recording sheet 27 is grasped between ejection rollers 100j. By way of example, the ejection rollers 100j may convey the recording sheet 27 to an automatic developing section 170 connected to the read-out and reproducing system. Alternatively, a tray or the like may be positioned close to the ejection rollers 100j, and the recording sheets 27, 27, ... may be sequentially ejected into the tray or the like. Also, a holding section for the recording sheet housing tray may be provided inside of the read-out and reproducing system, and the recording sheets 27, 27, ... may be housed in the tray and then taken out of the system and sent to an external automatic developing machine.

In the aforesaid read-out and reproducing section 120, the reproduction of the radiation image is carried out on a single recording sheet 27 immediately after the image is read out from a stimulable phosphor sheet 22. However, if the capacity of the memory 28 is increased, image read out may be carried out continuously on a plurality of the stimulable phosphor sheets in the read-out and reproducing section 120, image signals thus detected may be stored in the memory 28, and then image reproduction may be carried out continuously on a plurality of recording sheets. Also, instead of reproducing all of the read-out radiation images as hard copies on the recording sheets, the radiation images may be displayed on a display device such as a CRT, and only those images which are necessary may be reproduced as hard copies on the recording sheets.

As the recording sheet, besides the aforesaid ordinary silver halide photographic film, a dry silver suitable for heat development or the like may be used. Also, besides the photosensitive recording materials, a heat-sensitive recording material may also be used. As the development process in cases where silver halide photographic film is used, instead of the aforesaid wet development process, an instant process or the like may be used. The image read-out and reproducing method in accordance with the present invention is not limited to using stimulable phosphor sheets as the image storage sheets, but may carry out image read out by detecting light reflected by an image storage sheet or light passing through an image storage sheet.

We claim:

1. An image read-out and reproducing method for conveying an image storage sheet, on which an image has been recorded, or a recording sheet, on which an image is to be reproduced, in a sub-scanning direction by a single sub-scanning means, reading out the image from the image storage sheet by scanning the image storage sheet with read-out light in a main scanning direction and detecting the light emitted from the image storage sheet which is being scanned, and reproducing an image on the recording sheet by scanning the recording sheet in a main scanning direction with reproducing light modulated in accordance with the image, wherein the improvement comprises the steps of:
(i) combining laser beams produced by a plurality of semiconductor lasers and utilizing the combined laser beams as said read-out light, and
(ii) operating one or some of a plurality of said semiconductor lasers, modulating the laser beams emitted thereby and utilizing the laser beams thus produced as said reproducing light at the time of image reproduction.

2. A method as defined in claim 1 wherein said image storage sheet is a stimulable phosphor sheet carrying a radiation image stored thereon.

3. A method as defined in claim 1 wherein a plurality of said semiconductor lasers are secured to a single support.

4. An image read-out and reproducing apparatus for conveying an image storage sheet, on which an image has been recorded, or a recording sheet, on which an image is to be reproduced, in a sub-scanning direction by a single sub-scanning means, reading out the image from the image storage sheet by scanning the image storage sheet with read-out light in a main scanning direction and detecting the light emitted from the image storage sheet which is being scanned, and reproducing an image on the recording sheet by scanning the recording sheet in a main scanning direction with reproducing light modulated in accordance with the image, wherein the improvement comprises the provision of a scanning light producing means constituted so that laser beams produced by a plurality of semiconductor lasers are combined at the time of image read-out and the combined laser beams are utilized as said read-out light, whereas at the time of image reproduction one or some of a plurality of said semiconductor lasers are operated, and the laser beams emitted thereby are modulated and utilized as said reproducing light.

5. An apparatus as defined in claim 4 wherein said image storage sheet is a stimulable phosphor sheet carrying a radiation image stored thereon.

6. An apparatus as defined in claim 4 wherein a plurality of said semiconductor lasers are secured to a single support.

7. A multi-semiconductor-laser light source device for use in an image read-out and reproducing apparatus for conveying an image storage sheet, on which an image has been recorded, or a recording sheet, on which an image is to be reproduced, in a sub-scanning direction by a single sub-scanning means, reading out the image from the image storage sheet by scanning the image storage sheet with read-out light in a main scanning direction and detecting the light emitted from the image storage sheet which is being scanned, and reproducing an image on the recording sheet by scanning the recording sheet in a main scanning direction with reproducing light modulated in accordance with the image,
the multi-semiconductor-laser light source device comprising:
(i) a plurality of semiconductor lasers for image read out,
(ii) one or more semiconductor lasers for image reproduction,
(iii) collimator optical systems for respectively collimating laser beams produced by said semiconductor lasers for image read out and for image reproduction,
(iv) optical path adjusting elements for radiating said laser beams along optical paths parallel and close to one another, and
(v) a control means for operating said semiconductor lasers used during image read out so that they radiate at the time of image read out, and operating said semiconductor lasers used during image reproduction so that they radiate at the time of image reproduction,
wherein said semiconductor lasers used for image read out, said semiconductor lasers used for image reproduction, said collimator optical systems, and said optical path adjusting elements are supported on a single support.

8. A device as defined in claim 7 wherein said image storage sheet is a stimulable phosphor sheet carrying a radiation image stored thereon.

9. An image read-out and reproducing apparatus for conveying an image storage sheet, on which an image has been recorded, or a recording sheet, on which an image is to be reproduced, in a sub scanning direction by a single sub-scanning means, reading out the image from the image storage sheet by scanning the image storage sheet with read-out light in a main scanning direction and detecting the light emitted from the image storage sheet which is being scanned, and reproducing an image on the recording sheet by scanning the recording sheet in a main scanning direction with reproducing light modulated in accordance with the image,
wherein the improvement comprises the provision of a scanning light producing means constituted so that laser beams produced by a plurality of semiconductor lasers are combined at the time of image read-out and the combined laser beams are utilized as said read-out light, whereas at the same of image reproduction one or some of a plurality of said semiconductor lasers are operated, and the laser beams emitted thereby are modulated and utilized as said reproducing light,
wherein said scanning light producing means is a multi-semiconductor-laser light source device comprising:
(i) a plurality of semiconductor lasers for image read-out,
(ii) one or more semiconductor lasers for image reproduction,
(iii) collimator optical systems for respectively collimating laser beams produced by said semiconductor lasers for image read out and for image reproduction,
(iv) optical path adjusting elements for radiating said laser beams along optical paths parallel and close to one another, and
(v) a control means for operating said semiconductor lasers used during image read out so that they radiate at the time of image read out, and operating said semiconductor lasers used during image reproduction so that they radiate at the time of image reproduction,
wherein said semiconductor lasers used for image read out, said semiconductor lasers used for image reproduction, said collimator optical systems, and said optical path adjusting elements are supported on a single support 3.

* * * * *